United States Patent [19]

Markakis et al.

[11] E Re. 28,694

[45] Reissued Jan. 27, 1976

[54] FLUIDIC CLINOMETER CONTROL APPARATUS

[76] Inventors: Costas E. Markakis, 12 Aravantinou St., Ekali, Athens; George N. Vamvakoussis, Spiridon Trikoupi 39-41, Athens, Greece

[22] Filed: Feb. 19, 1975

[21] Appl. No.: 551,059

Related U.S. Patent Documents

Reissue of:

[64] Patent No.: 3,849,897
Issued: Nov. 26, 1974
Appl. No.: 418,303
Filed: Nov. 23, 1973

[52] U.S. Cl. ..... 33/365; 73/290 R; 33/377
[51] Int. Cl.[2] ..... G01C 9/22
[58] Field of Search ..... 33/365, 367, 377; 73/290 R

[56] References Cited

UNITED STATES PATENTS

| | | | |
|---|---|---|---|
| 1,012,993 | 12/1911 | Dissett | 33/377 |
| 2,557,021 | 6/1951 | Williams | 33/367 X |

FOREIGN PATENTS OR APPLICATIONS

| | | | |
|---|---|---|---|
| 235,343 | 5/1969 | U.S.S.R. | 33/377 |

*Primary Examiner*—Richard E. Aegerter
*Assistant Examiner*—Charles E. Phillips
*Attorney, Agent, or Firm*—Peter T. Dracopoulos

[57] ABSTRACT

Disclosed herein is a fluidic clinometer for automatically operating servomechanisms according to the angular displacements of a structure on which the inclinometer is fixedly mounted for integral movement therewith. It includes a substantially U-shaped tube having enlarged chambers of equal size at the free ends of its vertical legs which are open to the atmosphere, the walls of said chambers being formed of micropous material of a porosity to permit the passage of air, or similar gaseous fluid, but inhibit the escape of mercury, or other analogous liquid, therethrough; mercury, or other such liquid, partially filling the tube, up to about the middle of said chambers when the tube is in normal upright position; a substantially U-shaped casing concentrically surrounding said tube in airtight relation and providing an annular air space there-between; an air inlet medially of the horizontal or connecting part of said casing and an air outlet in each of the vertical legs of the casing; fluidic amplifying means having fluid communication with said outlets; fluid lines leading from the output side of the amplifying means for operating servomechanisms; and other fluid lines leading from the amplifying means to a differential pressure gauge indicating the angle and direction of inclination of said tube and casing, and hence of a structure on which the latter are to be mounted, in relation to a horizontal plane of reference. While this apparatus is capable of a variety of application, it is especially adapted for use in U.S. Pat. No. 3,689,953, Sept. 12, 1972, to the present co-inventor Costas E. Markakis, to control the amount and direction of the air needed to maintain the floating structures therein in stable or upright position.

20 Claims, 1 Drawing Figure

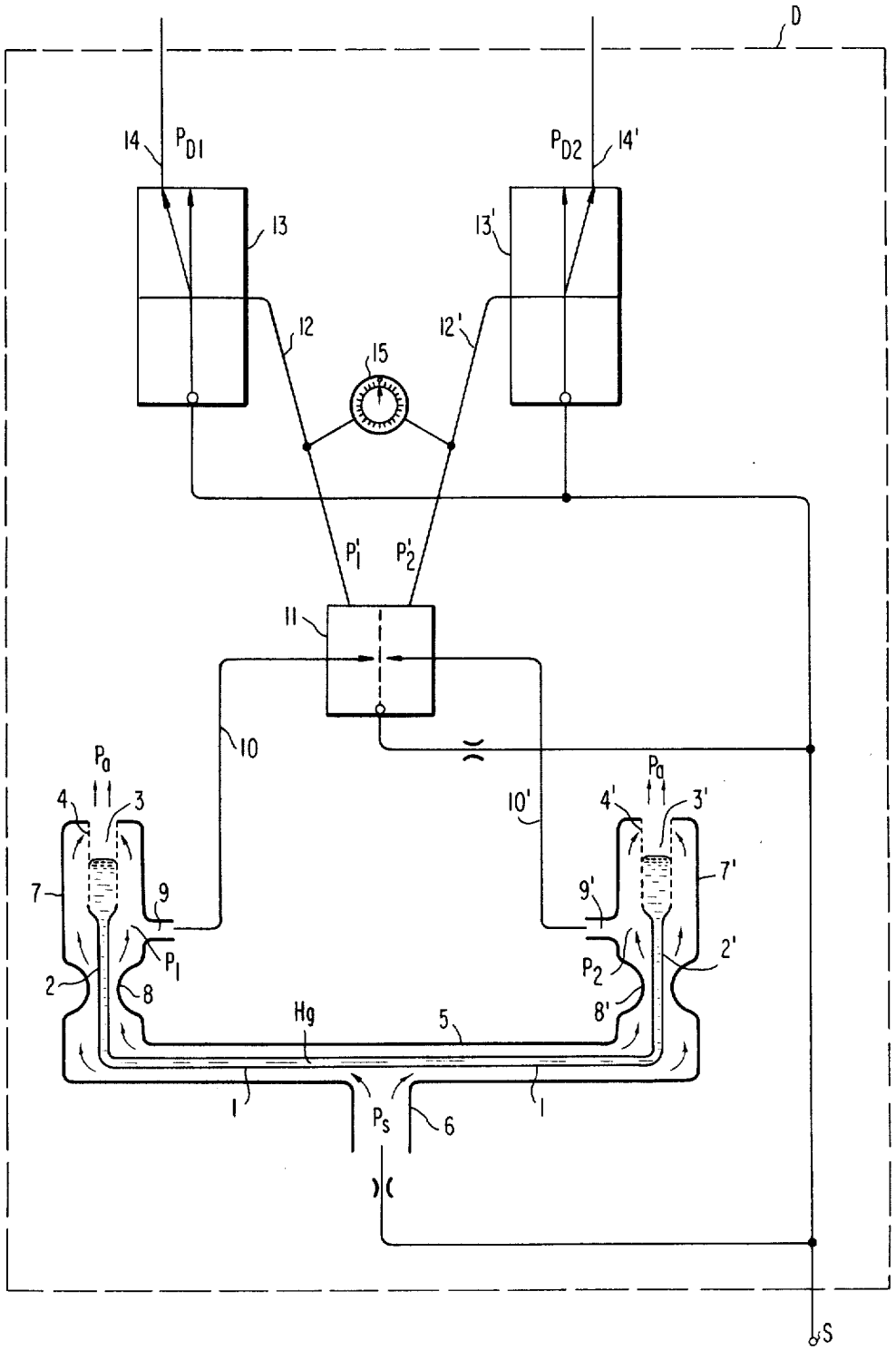
D
14
$P_{D1}$
$P_{D2}$
14'
13
13'
12
12'
15
$P'_1$
$P'_2$
11
10
10'
$P_a$
$P_a$
4
3
4'
3'
7
7'
9
9'
$P_1$
$P_2$
2
2'
8
8'
Hg
5
1
1
$P_s$
6
S

FLUIDIC CLINOMETER CONTROL APPARATUS

Matter enclosed in heavy brackets [ ] appears in the original patent but forms no part of this reissue specification; matter printed in italics indicates the additions made by reissue.

The present invention relates to a fluidic clinometer for automatically controlling servomechanisms of a system in response to the inclination of the former relative to a plane of reference.

An object of this invention is also to investigate and/or determine by fluidic means the angles of inclination, such as of the rolling and pitching of floating structures, or of other structures which are subject to oscillations along one or more horizontal axes.

Another object thereof is the utilization of our clinometer to automatically control the operation of servomechanisms in a stabilizing system for floating structures against rolling and pitching.

A further object of the invention is to carry out the foregoing by fluidic means without the use or need of gyroscopes, electric devices or inertia means, pendulums for example.

A still further object thereof is a novel clinometer of great simplicity, high reliability and durability, of substantially instantaneous response, minimum maintenance requirements and economy of manufacture.

The primary intended use of the invention is for sensing by fluidic means the rolling and/or pitching angles of floating structures, ships or boats in particular, and for the automatic actuation by said sensing means of level correcting mechanisms for maintaining such structures in their level or upright position. As previously noted herein, it is especially adapted for use in said U.S. Pat. No. 3,689,953, Sept. 12, 1972 to the present joint inventor Costas E. Markakis, which patent is hereby incorporated herein by reference, for replacing therein the gyroscopic controls for operating the air admitting valves, and thus the amount of air under pressure to the level correcting chambers. In this connection, reference is made to FIGS. 18–21 of said patent and to FIG. 21 in particular, wherein the Gyroscopic device is designated by numeral 636, the servomechanism by 620, the valve by 631 and 632 and the stabilizing chambers by 623 and 624.

DRAWING

The single FIGURE in the drawing shows diagrammatically the various parts of our invention in operative relation.

DESCRIPTION

Referring to the drawing, wherein like numerals designate like parts, the fuidic clinometer of the present invention comprises a substantially U-shaped tube having a horizontal or connecting part 1 and two vertical legs 2,2' terminating of their free ends in enlarged chambers 3,3'. The walls 4,4' of these chambers are formed of microporous material, of a porosity to permit the passage of air, or other similar fluid, therethrough but inhibit the escape of a heavy liquid such as mercury or other analogues liquid, from inside the chambers. The porosity is of the order of 50 microns. Said chambers are open to the atmosphere at their top, and said tube is partially filled with a suitable liquid, preferably mercury, up to about the middle of the vertical height of the porous chambers when the connecting portion 1 is horizontal and the legs 2,2' are vertical.

Said tube is concentically sourrounded in airtight relation by a substantially U-shaped casing of greater diameter than the tube, thus providing as annular air space there-between. The connecting part 5 of this casing is provided, medially of its length, with a fluid inlet 6, and its vertical legs 7,7' are constricted at 8,8' and formed there-above with fluid outlets 9 and 9', respectively. The casing is secured to the tube for integral movement therewith. The connecting parts 1 and 5 of said tube and casing are preferably rectilinear and of greater length that the height of the respective legs 2,2' and 7,7', as shown in the drawing.

Outlets 9 and 9' are connected by fluid lines 10 and 10' to a fluidic proportional amplifier 11, and the outlets or outputs of the latter are connected by fluid lines 12 and 12' to monostable amplifiers 13 and 13', respectively. Both of these types of amplifiers are conventional. Fluid lines 14, 14', leading from the outputs of the monostable amplifiers are intended to be connected to servomechanisms to be controlled by the amplified air pressure therein.

A differential pressure gauge 15, calibrated in degrees in opposite directions from a zero reference point, is connected across the output fluid lines 12,12' of the proportional amplifier, thereby providing a ready visual indication of the instant angles of inclination of the clinometer, and hence of the structure on which the latter is mounted.

In practice all of the above described elements constituting our invention are mounted as a unitary structure on a common base and in a single casing, as designated in the drawing by the broken outline D.

OPERATION

For a clearer understanding of the invention, we will consider the clinometer as being fixedly mounted on a floating structure, or on a structure subject to rocking about one or both of its main axes, with said [ structue ] *structure* being in level or upright position and said clinometer disposed at a right angle to the rocking axis of the structure. Where correction is needed along both main horizontal axes of the structure, two clinometers at right angles to each other will, obviously, be employed.

In the stabilized position of the floating structure, i.e., in the level position of clinometer, the surface of the mercury in porous chambers 3,3' will be at the same level, about the middle of their vertical height. Humidity and temperature conditioned air entering casing 5, via inlet 6, at a pressure $P_s$, passes through constrictions 8,8' and onto the exterior of the porous chamber walls 4,4', whereat its pressure is altered to $P_1$ and $P_2$, respectively. Due to the same porosity and the same peripheral surface of these chambers, and also their symmetry in relation to the inlet 6, when the floating structure and the clinometer thereon are in level position pressures $P_1$ and $P_2$ will be equal, i.e., $P_1 = P_2$. Similarly, the pressure drop of the air escaping through the porous walls of the chambers to the atmosphere, $P_1 - P_a$ and $P_2 - P_a$, will be equal, where $P_2$ is the atmospheric pressure at the exit side of chambers 3 and 3'.

Assuming now that the floating structure with the clinometer thereon rocks at an angle $\phi$ toward the right as viewed in the drawing, then the surface of the mercury in the right chamber 3' will rise, while that in the left chamber 3 will descend correspondingly. Accordngly, the porous surface 4' of the wall of chamber 3' hrough which air can escape to the atmosphere will lecrease, causing a corresponding increase in $P_2$ and ıence an increase in the pressure drop $P_2 - P_a$. These :hanges will continue until the mercury in chamber 3' eaches the top thereof, whereat, manifestly, there will ɔe no further escape of air. In the left chamber 3 the everse will obviously take place, i.e., the porous exɔosed surface of wall 4 and the air escaping therehrough will correspondingly increase and pressure $P_1$ ınd pressure drop $P_1 - P_a$ will decrease inversely as the :onditions in chamber 3'. Accordingly, there will result ı differential pressure $P_2 - P_1$ which will increase in ɔroportion to the angle of inclination of the floating tructure. When the latter rocks toward the left as 'iewed in the drawing, it is apparent that the reverse of he foregoing will take place, i.e., $P_1$ and $P_1 - P_a$ will ncrease and $P_2$ and $P_2 - P_a$ will correspondingly de-:rease. This increase in pressure, whether in $P_2$ or $P_1$, vill be ultimately utilized to control a servomechanism ɔr mechanisms.

Proportional amplifier 11, of conventional construcion, receives signals from outlets 9 and 9', by way of luid lines 10 and 10', and produces an output differenial signal which is proportional to the input signal but ɔf increased magnitude, $P'_1$ or $P'_2$.

The digital monostable type amplifier, such a 13 and 3' herein which are connected to opposite output ides of the proportional amplifier 11, is also convenional and is characterized by having only one output ignal change produced and that only when the input ignal magnitude is raised above a minimum level. This eature makes the monostable amplifier ideally adaptble to the stabilization of floating structures; that is, aking the permissible angle of roll or pitch of a floating tructure as one-tenth of 1° in either direction from its evel position, and selecting or adjusting amplifiers 13, 3' to produce an output signal when that angle is eached, as reflected by the input signal, the value of heir output pressures $P_{D1}$ or $P_{D2}$ will be substantially ero until the angle of inclination $\phi$ reaches 1/10 of 1° ɔr −1/10 of 1°, at which point the corresponding presure suddenly jumps to a predetermined value, about $8P'_1$ or $8P'_2$, as the case may be, and thence remains :onstant for any greater angle of inclination. The well :nown OR-NOR amplifier may also be used for the nonostable amplifiers 13 and 13', but with only one :ontrol input signal.

The amplified pressure of the air issuing from said nonostable amplifiers into fluid lines 14,14' will effecively actuate servomechanisms; and in the example eferred to above in connection with co-applicant Mar:akis' said patent, it will open valves to maintain floatng structures in level or upright position.

We claim:

1. A fluidic clinometer for automatically controlling he operation of servomechanisms, comprising a subtantially U-shaped tube with its legs terminating in hambers of equal size, which are open to the atmophere and are formed of microporous material, of a ɔorosity permitting the passage of air, or other similar luid, therethrough but inhibiting the escape of liquid rom within the chambers; a suitable liquid partially illing the tube up to about the middle of the height of he chambers when the leg connecting part of the U-haped tube is horizontal and the legs are vertical; a ubstantially U-shaped, fluidtight casing of greater diımeter than the tube concentrically enclosing said tube throughout, thus forming an annular air passage between said tube and said casing, and said casing being provided with a fluid inlet medially of its connecting part and with a fluid outlet in each of its legs, the outlets being adapted to communicate with and control servomechanisms.

2. A fluidic clinometer according to claim 1 wherein the liquid in the tube is mercury.

3. A fluidic clinometer according to claim 1 wherein the porosity of said chambers is of the order of 50 microns.

4. A fluidic clinometer according to claim 1 wherein each leg of the casing is constricted between its juncture with the connecting part of the casing and its said outlet.

5. A fluidic clinometer according to claim 1 wherein the connecting part of the U-shaped tube and casing are substantially rectilinear and longer than the height of their vertical legs.

6. A fluidic clinometer according to claim 1 including fluidic amplifying means connected to said fluid outlets of said casing for amplifying the pressure of the air issuing therefrom therefrom.

7. A fluidic clinometer according to claim 6 wherein the amplifying means comprise a fluidic proportional amplifier connected to the outlets of the legs of said casing; two fluidic monostable amplifiers having fluid connection with the outlets of said proportional amplifier; and fluid lines extending from the outputs of said monostable amplifiers adapted to communicate with and control servomechanisms.

8. A fluidic clinometer according to claim 7 including a differential pressure gauge bridging the fluid connections between the proportional and the monostable amplifiers, providing a visual indication of the angles of inclination of the tube and casing, and hence of a structure on which they are to be fixedly mounted.

9. A fluidic clinometer according to claim 1 wherein the liquid is mercury, each leg of the casing is constricted between its juncture with the connecting part of the casing and its said outlet, and fluidic amplifying means connected to the fluid outlets of said casing for amplifying the pressure of the air issuing therefrom.

10. A fluidic clinometer according to claim 9 wherein the amplifying means comprise a fluidic proportional amplifier connected to the outlets of the legs of said casing; two fluidic monostable amplifiers having fluid communication with said proportional amplifier; and fluid lines extending from the outlets of said monostable amplifiers, adapted to communicate with and control servomechanisms.

11. A fluidic clinometer according to claim 10 including a differential pressure gauge connected across the output lines of the proportional amplifier and calibrated in degrees in opposite directions from a zero reference point, thereby providing a ready visual indication of the angle and direction of inclination of the clinometer, and hence of a structure on which it is to be fixedly mounted.

12. A fluidic clinometer comprising a substantially U-shaped tube with its legs terminating in chambers of equal size, which are open to the atmosphere and are formed of microporous material, of a porosity permitting the passage of air, or other similar fluid, therethrough but inhibiting the escape of liquid from within the chambers; a suitable liquid partially filling the tube up to about the middle of the height of the chambers when the leg connecting part of the U-shaped tube is horizontal and the legs are vertical; a substantially U-shaped, fluidtight casing of greater diameter than the tube concentrically enclosing said tube throughout, thus forming an annular air passage between said tube and said casing and said casing being provided with a fluid inlet medially of its leg connecting part and with a fluid outlet in each of its legs; and means communicating with said outlets for indicating the pressure differential there-between in terms of the angles of inclination of the tube and casing about an axis transversely thereof.

13. A fluidic clinometer according to claim 12 wherein the legs of said casing are constricted between said outlets and the juncture of the legs of the casing with the leg connecting part of the latter.

*14. A fluidic clinometer control apparatus comprising a substantially U-shaped tube with its legs terminating in chambers of equal size, which are open to the atmosphere and are formed of microporous material, of a porosity permitting the passage of air, or other similar fluid, therethrough but inhibiting the passage of liquid from within the chambers; a suitable liquid partially filling the tube up to about the middle of the height of the chambers when the leg connecting part of the tube is horizontal and its legs are vertical; a fluidtight enclosure surrounding each of said microporous chambers in spaced relation to said chambers, thus forming an air space therebetween, said air space between said chamber and said enclosure being substantially equal in both legs, each enclosure being provided with a fluid inlet, to be connected to a source of pressurized fluid, and with a fluid outlet; and pressure responsive means connected to said fluid outlets and adapted to control the operation of servomechanisms.*

*15. A fluidic clinometer control apparatus according to claim 14 wherein the porosity of said microporous chambers is of the order of 50 microns.*

*16. A fluidic clinometer control apparatus according to claim 15 wherein the liquid in the tube is mercury.*

*17. A fluidic clinometer control apparatus according to claim 14 wherein the pressure responsive means includes fluidic amplifying means to said outlets for amplifying the pressure of the fluid issuing from the outlets of said enclosures.*

*18. A fluidic clinometer control apparatus according to claim 17 wherein said fluidic amplifying means comprises, a fluidic proportional amplifier connected to said outlets, two fluidic monostable amplifiers having fluid communication with the outlets of said proportional amplifier; and fluid lines extending from the outputs of said monostable amplifiers adapted to communicate with and control servomechanisms.*

*19. A fluidic clinometer control apparatus according to claim 18 including a differential pressure gauge bridging the fluid connections between the proportional and the monostable amplifiers, providing a visual indication of the angles of inclination of the tube, and hence of a structure on which the tube is to be mounted.*

*20. A fluidic clinometer control apparatus according to claim 18 wherein the porosity of the microporous chambers is of the order of 50 microns and the liquid in the tube is mercury.*

* * * * *